(12) United States Patent
Peng et al.

(10) Patent No.: US 8,251,328 B2
(45) Date of Patent: Aug. 28, 2012

(54) MOUNTING APPARATUS FOR DATA STORAGE DEVICE

(75) Inventors: Wen-Tang Peng, New Taipei (TW); Ju-Wen Dai, Shenzhen (CN); Xin-Hu Gong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 13/086,400

(22) Filed: Apr. 14, 2011

(65) Prior Publication Data

US 2012/0153112 A1 Jun. 21, 2012

(30) Foreign Application Priority Data

Dec. 17, 2010 (CN) .......................... 2010 0 0593938

(51) Int. Cl.
*A47F 5/00* (2006.01)
(52) U.S. Cl. .................. 248/298.1; 248/222.11; 248/65; 248/73; 361/679.31; 361/725
(58) Field of Classification Search .................. 248/918, 248/291.1, 316.1, 316.8
See application file for complete search history.

(56) References Cited

U.S. PATENT DOCUMENTS

| | | | | |
|---|---|---|---|---|
| 6,008,984 A * | 12/1999 | Cunningham et al. | ... | 361/679.31 |
| 6,377,450 B1 * | 4/2002 | Gan | .................. | 361/679.34 |
| 7,036,783 B2 * | 5/2006 | Chen et al. | .................. | 248/298.1 |
| 7,061,756 B2 * | 6/2006 | Wu | .................. | 361/679.33 |
| 7,106,582 B2 * | 9/2006 | Albrecht et al. | ......... | 361/679.34 |
| 7,212,402 B2 * | 5/2007 | Hsiao | .................. | 361/679.33 |
| 7,369,403 B2 * | 5/2008 | Chen et al. | .................. | 361/679.33 |
| 7,441,744 B2 * | 10/2008 | Chen et al. | .................. | 248/694 |
| 7,492,585 B2 * | 2/2009 | Zhang et al. | .................. | 361/679.37 |
| 7,571,884 B2 * | 8/2009 | Chen et al. | .................. | 248/291.1 |
| 7,760,495 B2 * | 7/2010 | Li | .................. | 361/679.37 |
| 7,780,137 B2 * | 8/2010 | Hansel et al. | .................. | 248/346.01 |
| 7,848,097 B2 * | 12/2010 | Yang | .................. | 361/679.33 |
| 7,965,501 B2 * | 6/2011 | Liang | .................. | 361/679.37 |
| 8,070,243 B2 * | 12/2011 | Chen et al. | .................. | 312/223.2 |
| 2008/0136298 A1 * | 6/2008 | Xiao | .................. | 312/223.2 |

* cited by examiner

*Primary Examiner* — Terrell McKinnon
*Assistant Examiner* — Monica Millner
(74) *Attorney, Agent, or Firm* — Altis Law Group, Inc.

(57) ABSTRACT

A mounting apparatus for a data storage device includes a bracket, a support member slidably mounted to the bracket, two first and second locking members, and two clamping members. Each first locking member includes a first hook detachably locked to the support member, and a fixing pole to clamp the corresponding clamping member. Each second locking member includes a second hook fixed to the support member, and a fixing portion to fix the corresponding clamping member. When the first hooks of the first locking members disengage from the support member, and the first locking members are rotated to drive the corresponding clamping members away from the support member. When the data storage device is sandwiched between the support member and the clamping members, the first locking members are rotated to make the first hooks lock to the support member.

11 Claims, 8 Drawing Sheets

MOUNTING APPARATUS FOR DATA STORAGE DEVICE

BACKGROUND

1. Technical Field

The disclosure relates to a mounting apparatus for data storage devices.

2. Description of Related Art

A bracket is often mounted in a computer enclosure, on which a storage device can be accommodated. However, if a data storage device is used outside the computer enclosure, another bracket outside the enclosure is needed, which can be inconvenient and costly.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
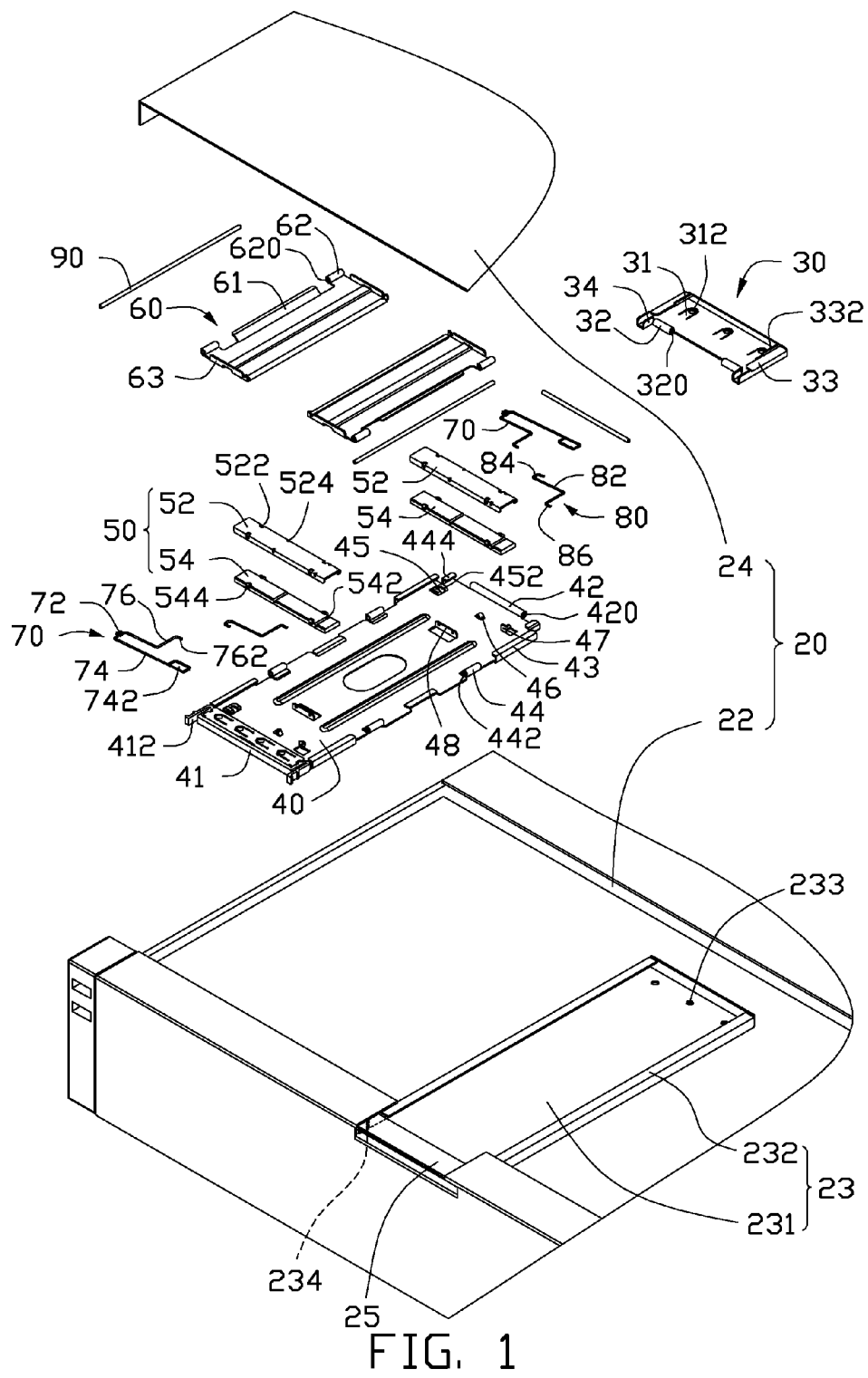
FIG. 1 is an exploded, isometric view of an exemplary embodiment of a mounting apparatus for a data storage device.
Figure 2:
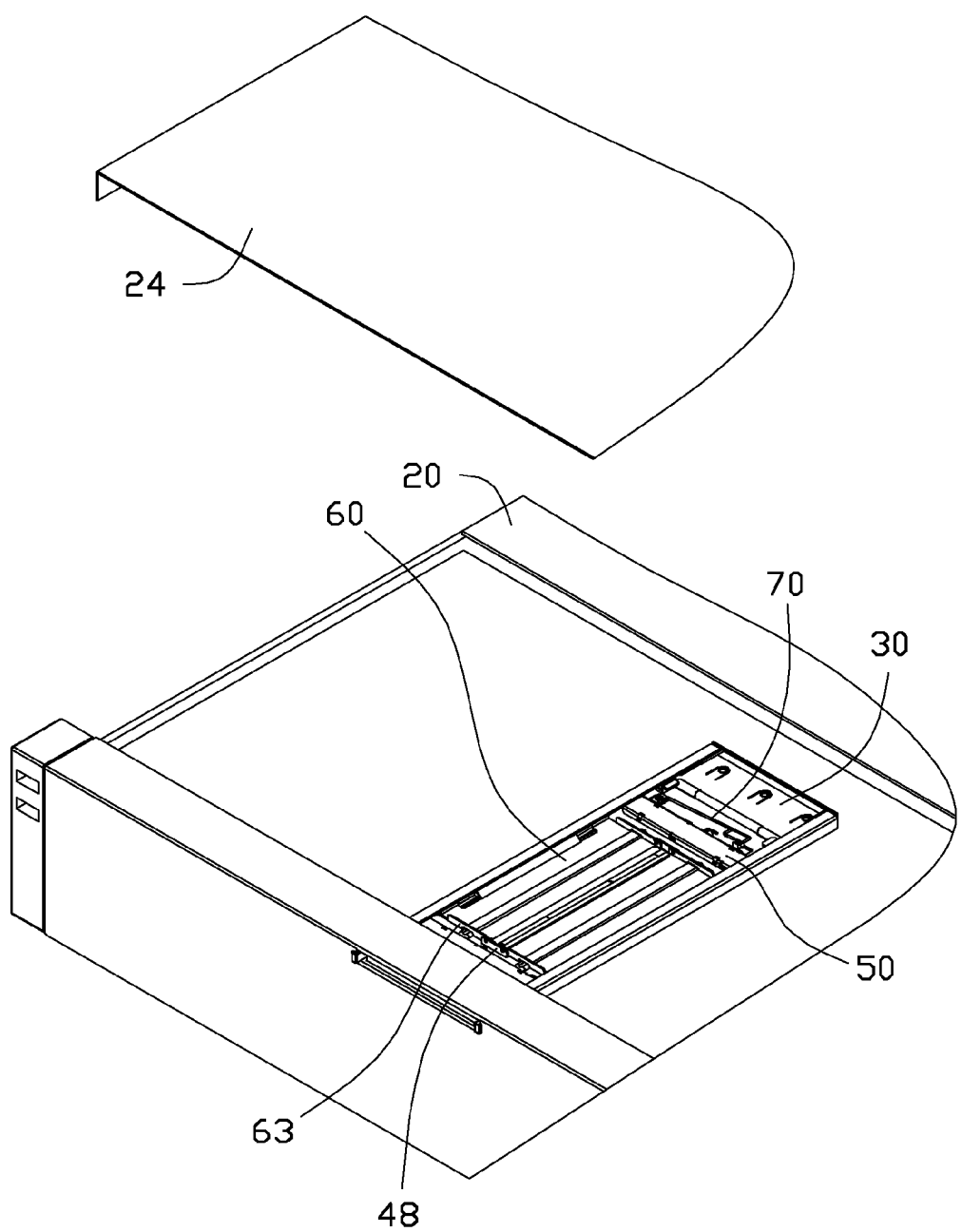
FIG. 2 is an assembled, isometric view of FIG. 1.
Figure 7:
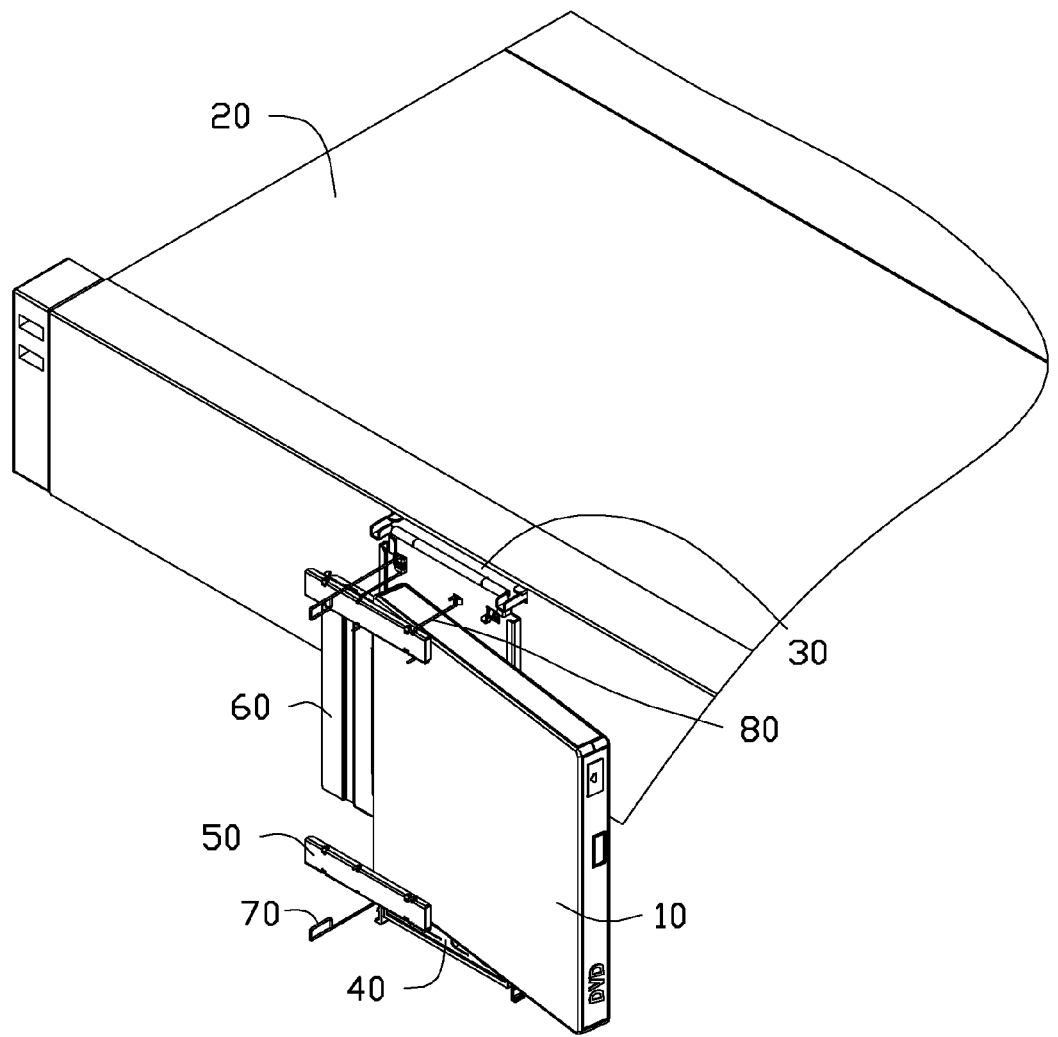

Referring to FIGS. 1 and 2, a mounting apparatus is provided to accommodate a data storage device 10 (shown in FIG. 7). The mounting apparatus includes a bracket 20, a positioning member 30 slidably mounted to the bracket 20, a support member 40 pivotably mounted to the positioning member 30, two clamping members 50 mounted to the support member 40, two support boards 60 pivotably mounted to the support member 40, two first locking members 70, two second locking members 80, and a plurality of pins 90.

The bracket 20 includes a main body 22 and a cover 24 mounted to the main body 22. The main body 22 includes a receiving case 23 and a resisting board 25. The receiving case 23 includes a bottom plate 231 and two side plates 232 extending from opposite sides of the bottom plate 231. The bottom plate 231 defines a plurality of positioning holes 233. The front end of each side plate 232 defines a locking slot 234. The resisting board 25 is located at the front end of the main body 22, and is connected between tops of the side plates 232.

A plurality of elastic tabs 31 extends down from the positioning member 30, and a protrusion 312 protrudes down from a distal end of each elastic tab 31. Two connecting portions 32 extend from opposite ends of a front side of the positioning member 30. Each connecting portion 32 axially defines a pivot hole 320. Two rims 33 extend up from opposite ends of the positioning member 30, and a guiding protrusion 332 protrudes from each rim 33 toward the other rim 33. Two resisting tabs 34 extend from the positioning member 30, at opposite ends of the connecting portions 32.

An operation portion 41 protrudes from a front end of the support member 40, and two elastic hooks 412 extend from opposite ends of the operation portion 41. A pivoting portion 42 protrudes out from a rear end of the support member 40, and the pivoting portion 42 axially defines a pivot hole 420. Two L-shaped elastic tabs 444 extend from the rear end of the support member 40, at opposite ends of the pivoting portion 42. Two L-shaped support tabs 43 extend from front and rear ends of each side of the support member 40. Two cylinder shaped pivoting portions 44 extend from each side of the support member 40, locating between the support tabs 43. Each pivoting portion 44 axially defines a pivot hole 442. An L-shape first hook 45, a V-shaped second hook 46, and a fixing tab 47 extend from each of the front and rear ends of the support member 40. Each first hook 45 defines a slot 452. The second hook 46 is between the first hook 45 and the fixing tab 47. Opposite ends of the second hook 46 are connected to the support member 40. Two resisting tabs 48 extend from the support member 40, between the second hooks 46 at the front and rear ends of the support member 40.

Each clamping member 50 includes a U-shaped receiving portion 52 and a locking portion 54 received in the receiving portion 52. The receiving portion 52 defines two pairs of cutouts 522, and two pairs of through holes 524 through opposite sidewalls. The locking portion 54 defines two slots 542 transversely through the locking portion 54. Two pairs of protrusions 544 protrude out from opposite walls of the locking portion 54. The protrusions 544 are engaged in the cutouts 522 of the receiving portion 52, and each slot 542 is aligned with a corresponding pair of the through holes 524.

Two connecting portions 62 extend from opposite ends of one side of each support board 60, and each connecting portion 62 defines a pivot hole 620. A slanting board 61 extends from the side of the support board 60, between the connecting portions 62. Two flanges 63 extend from opposite ends of each support board 60, perpendicular to the side of the support board 60.

Each first locking member 70 includes a curled pivoting portion 72, an operation pole 74, and a fixing pole 76. The operating pole 74 perpendicularly extends from a first end of the pivoting portion 72, and a hook 742 is formed at a distal end of the operation pole 74. The fixing pole 76 is substantially L-shaped, and perpendicularly extends from a second end of the pivoting portion 72, opposite to the first end. A resisting hook 762 extends from a distal end of the fixing pole 76.

Each second locking member 80 includes a pole portion 82, a hook 84 extending from a first end of the pole portion 82, and a fixing portion 86 extending from a second end of the pole portion 82.

Referring to FIG. 2, in assembly, a first pin 90 is extended through the pivot hole 320 of one of the connecting portions 32 of the positioning member 30, the pivot hole 420 of the support member 40, and the pivot hole 320 of the other connecting portion 32 of the positioning member 30. Therefore, the support member 40 is pivotably mounted to the positioning member 30. The elastic tabs 444 of the support member 40 resist against the resisting tabs 34 of the positioning member 30, correspondingly. A second pin 90 is extended through the pivot hole 620 of one of the connecting portions 62 of each support board 60, the pivot holes 442 are on a corresponding side of the support member 40, and the pivot hole 620 of the other connecting portion 62 of the support board 60. Therefore, the support boards 60 are pivotably mounted to the opposite sides of the support member 40. The flanges 63 of the support boards 60 detachably abut against the resisting tabs 48 of support member 40. The fixing pole 76 of each first locking member 70 extends through one pair of the through holes 524 of the corresponding clamping member 50, to be received in the corresponding slot 542 of the locking portion 54. The fixing portion 86 of each second locking member 80 extends through the other pair of the through holes 524 of the corresponding clamping member 50, to be received in the corresponding slot 542 of the locking portion 54. The protrusions 544 of the locking portion 54 are engaged in the cutouts 522 of the receiving portion 52, to mount the locking portion 54 and the receiving portion 52 together. Thereby, the first and second locking members 70 and 80 are mounted to the corresponding clamping members 50. The pivoting portion 72 of each first locking member 70 is latched in the slot 452 of the corresponding first hook 45, the hook 84 of each second locking member 80 is latched to the corresponding second hook 46.

The operation pole 74 of each first locking member 70 is operated to latch the hook 742 of the first locking member 70 to the corresponding fixing tab 47, to oppose each clamping member 50 to resist against the support member 40. The support member 40 is inserted into the receiving case 23 of the bracket 20. The guiding protrusions 332 of the positioning member 30 slidably resist against the side plates 232 of the receiving case 23. The protrusions 312 of the positioning member 30 are latched in the positioning holes 233 of the receiving case 23. The elastic hooks 412 of the supporting member 40 are latched in the locking slots 234 of the bracket 20.

Figure 3:
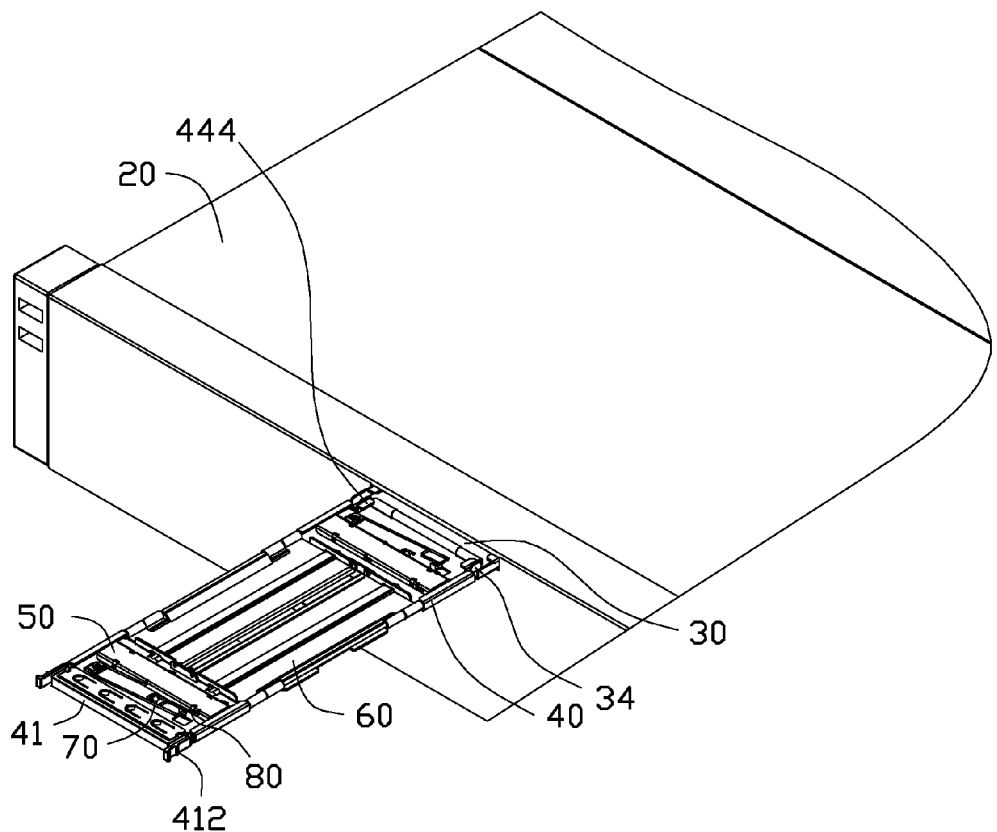
FIGS. 3 to 8 show different operating states of the mounting apparatus for a data storage device.
Figure 4:
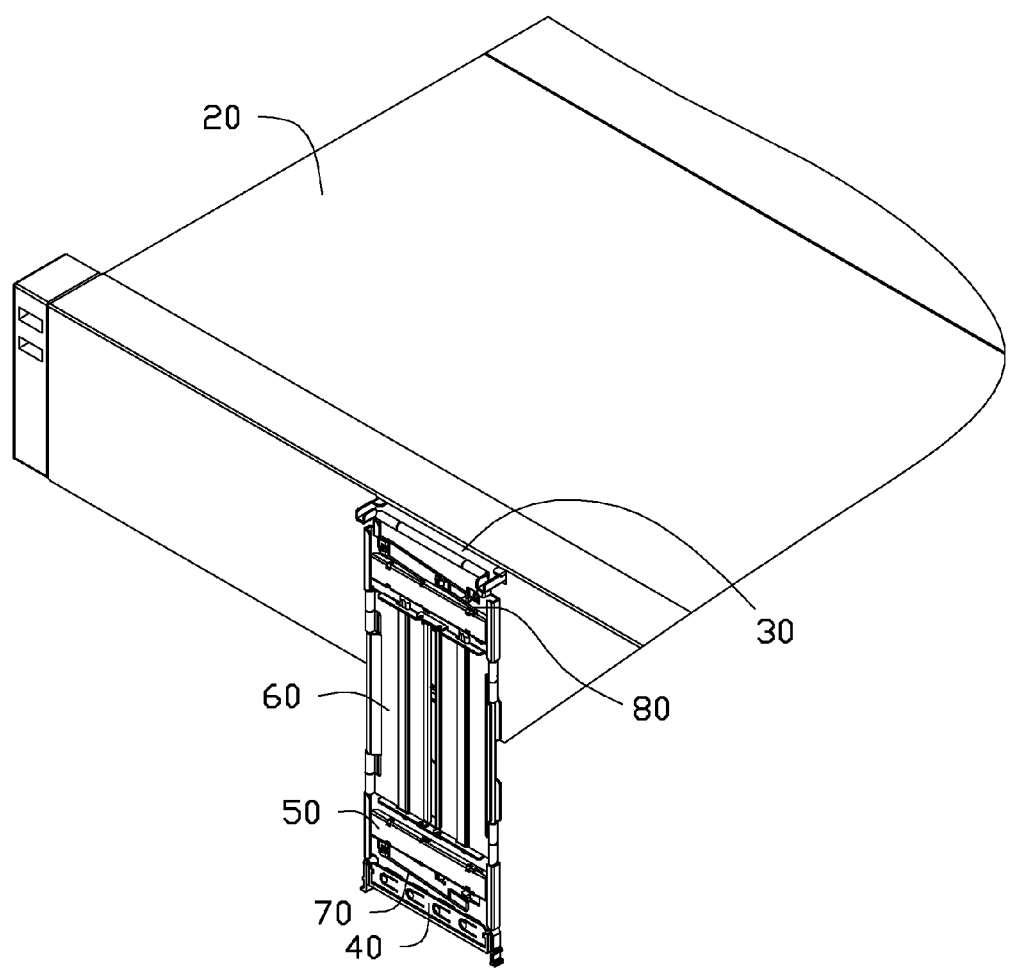
Figure 5:
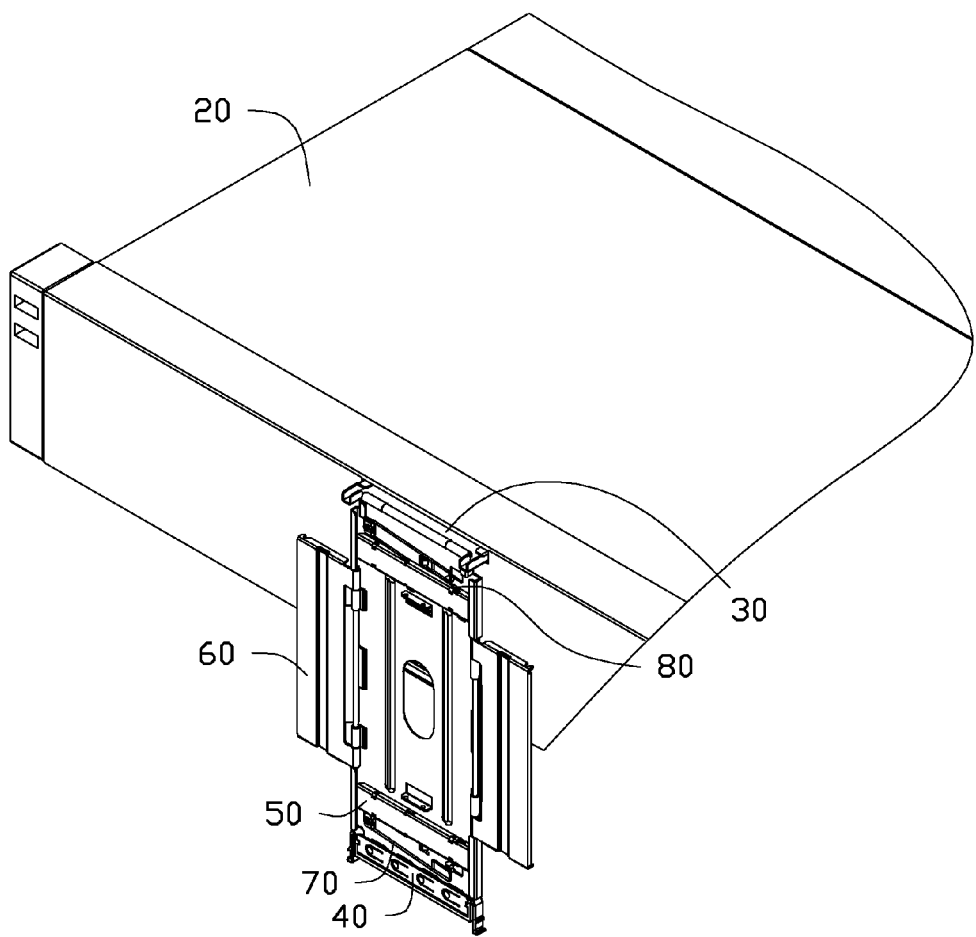
Figure 6:
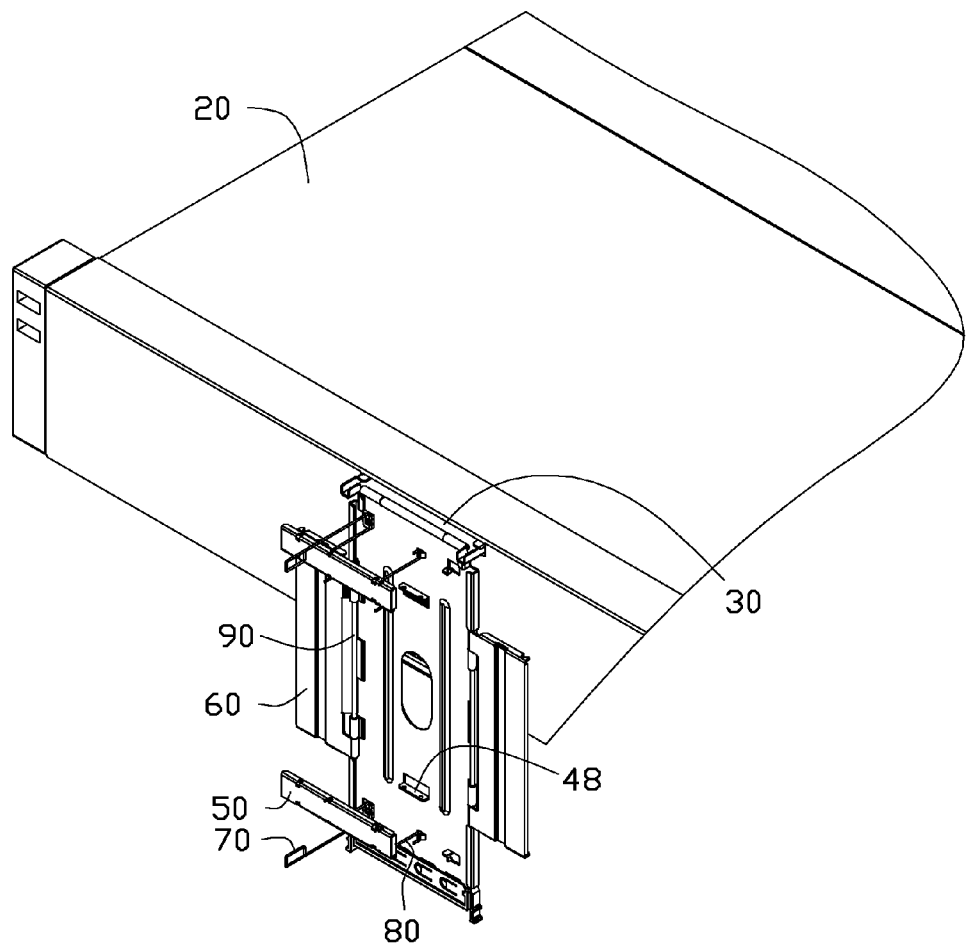

Referring to FIGS. 3 and 6, in use, the elastic hooks 412 are deformed to be separated from the locking slots 234. The elastic tabs 31 are deformed to separate the protrusions 312 from the positioning holes 233. The operation portion 41 of the support member 40 is operated out to move support member 40 and the positioning member 30 out. The guiding protrusions 332 are slid along the side plates 232 of the receiving case 23. When the guiding protrusions 332 resist against the resisting board 25 of the bracket 20, the positioning member 30 cannot move further. The support member 40 is operated to rotate about the first pin 90 to be perpendicular to the bracket 20. The hooks 742 of the first locking members 70 are separated from the fixing tabs 47 of the support member 40. The operation poles 74 of the first locking members 70 are rotated to be perpendicular to the support member 40 about the pivoting portions 72, so the clamping members 50 are driven to move away from the support member 40, and the second locking members 80 are deformed. (see FIG. 6) The support boards 60 are rotated about the second pins 90 to be open, until coplanar with the support member 40.

Figure 8:
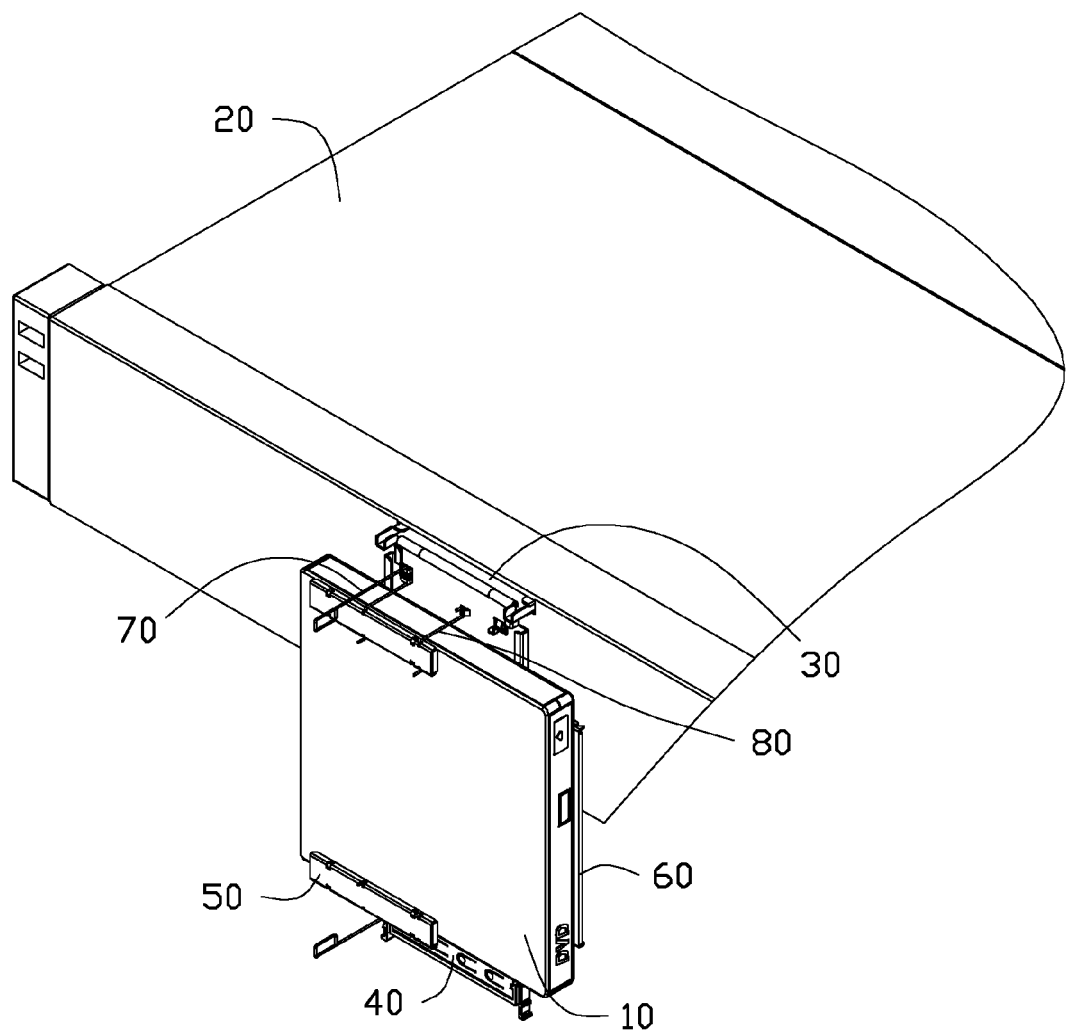

Referring to FIGS. 7 and 8, the data storage device 10 is received between the support member 40 and the clamping members 50. The operation poles 74 of the first locking members 70 are rotated about the pivoting portions 72 toward the support member 40, until the hooks 742 are latched to the fixing tabs 47, to drive the clamping members 50 to resist against the data storage device 10. Thus, the data storage device 10 is tightly sandwiched between the support member 40 and the clamping members 50.

In other embodiments, obviously, when the width of the data storage device 10 is equal to the width of the support member 40, the support boards 60 do not need to be opened, or the support boards 60 can be omitted.

In other embodiments, after the data storage device 10 is mounted to the support member 40, the support member 40 together with the data storage device 10 can be pushed in the bracket 20. The cover 24 is then mounted to the main body 22.

It is believed that the present embodiment and its advantages will be understood from the foregoing description, and it will be apparent that various changes may be made thereto without departing from the spirit and scope of the description or sacrificing all of their material advantages, the example hereinbefore described merely being exemplary embodiment.

What is claimed is:

1. A mounting apparatus for a data storage device, the mounting apparatus comprising:
    a bracket;
    a support member slidably mounted to the bracket;
    two first locking members pivotably mounted to two opposite ends of the support member, each first locking member comprises a first hook detachably locked to the support member, and a fixing pole;
    two second locking members each comprising a second hook fixed to a corresponding one of the ends of the support member, and a fixing portion; and
    two clamping members each mounted to a distal end of the fixing pole of a corresponding one of the first locking members and a distal end of the fixing portion of a corresponding one of the second locking members at a corresponding one of the ends of the support member;
    wherein when the first hooks of the first locking members are locked to the support member, the clamping members are folded to the support member, the support member is operable to be received in the bracket; and
    wherein when the support member is moved out of the bracket, the first hooks of the first locking members are operable to be disengaged from the support member, the first locking members are operable to rotate to drive the corresponding clamping members away from the support member, the data storage device is attached between the support member and the clamping members, the first locking members are rotated to make the first hooks locked to the support member, thereby the data storage device is sandwiched between the support member and the clamping members.

2. The mounting apparatus of claim 1, wherein a substantially L-shape third hook and a fixing tab extend from each of the ends of the support member, each third hook defines a slot, each first locking member comprises a pivoting portion received in the corresponding slot, the first hook of each first locking member is detachably locked to the corresponding fixing tab.

3. The mounting apparatus of claim 2, wherein each first locking member further comprises an operation pole extending from a first end of the pivoting portion, the first hook of the first locking member extends from a distal end of the operation pole, the fixing pole of the first locking member extends from a second end of the pivoting portion.

4. The mounting apparatus of claim 2, wherein two fourth hooks extend from the support member, each fourth hook is between the corresponding third hook and the fixing tab, the second hook of each second locking member is fixed to the corresponding fourth hook.

5. The mounting apparatus of claim 1, wherein each clamping member comprises a receiving portion and a locking portion received in the receiving portion, the receiving portion defines two pairs of through holes through opposite sidewalls of the receiving portion, the locking portion defines two slots transversely extending through opposite sidewalls of the locking portion and each aligning with one pair of the through holes of the receiving portion, the fixing pole of each first locking member extends through one pair of through holes of the receiving portion to be received in one of the slots of the locking portion, the fixing portion of each second locking member extends through the other pair of through holes of the receiving portion to be received in the other slot of the locking portion.

6. The mounting apparatus of claim 5, wherein opposite sidewalls of the receiving portion further define two pairs of cutouts, two pairs of protrusions protrude out from the opposite sidewalls of the locking portion, to be engaged in the corresponding cutouts of the receiving portion.

7. The mounting apparatus of claim 1, further comprising a positioning member slidably mounted to the bracket, wherein the support member is pivotably mounted to the positioning member.

8. The mounting apparatus of claim 7, wherein the positioning member comprises two guiding protrusions, the bracket comprises two resisting board slidably resisted against the guiding protrusions.

9. The mounting apparatus of claim 7, wherein two connecting portions extend from the positioning member, each connecting portion defines a first pivot hole, a pivoting portion protrudes out from one of the ends of the support member, the pivoting portion defines a second pivot hole, a first pin is extended through one of the first pivot holes of the positioning member, the second pivot hole of the support member, and the other pivot hole of the positioning member.

10. The mounting apparatus of claim 1, further comprising two support boards pivotably mounted to opposite sides of the support member, wherein two flanges extend from opposite ends of each support board, two resisting tabs extend from the support member to resist against the flanges after the support boards are pivoted to be folded to the support member, wherein after the support boards are pivoted to move away from each other, the support boards are operable to coplanar with the support member.

11. The mounting apparatus of claim 10, wherein a substantially L-shape third hook, a fourth hook, and a fixing tab extend from each of the ends of the support member, each third hook defines a slot, each first locking member comprises a pivoting portion received in the corresponding slot, the first hook of each first locking member is locked to the corresponding fixing tab, the second hook of each second locking member is fixed to the corresponding fourth hook.

* * * * *